(12) United States Patent
Edwards et al.

(10) Patent No.: US 11,174,009 B2
(45) Date of Patent: Nov. 16, 2021

(54) AIRCRAFT LANDING GEAR ARRANGEMENT

(71) Applicant: Airbus Operations Limited, Bristol (GB)

(72) Inventors: Henry Edwards, Bristol (GB); Keith Macgregor, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 143 days.

(21) Appl. No.: 16/540,534

(22) Filed: Aug. 14, 2019

(65) Prior Publication Data

US 2020/0062380 A1    Feb. 27, 2020

(30) Foreign Application Priority Data

Aug. 22, 2018   (GB) ..................................... 1813694

(51) Int. Cl.
     *B64C 25/16*      (2006.01)

(52) U.S. Cl.
     CPC .................................... *B64C 25/16* (2013.01)

(58) Field of Classification Search
     CPC ....................................................... B64C 25/16
     See application file for complete search history.

(56) References Cited

U.S. PATENT DOCUMENTS

| | | | |
|---|---|---|---|
| 5,979,828 A | 11/1999 | Gruensfelder et al. | |
| 9,248,905 B2 | 2/2016 | Gerard et al. | |
| 9,815,549 B1 | 11/2017 | Shammoh | |
| 2013/0320144 A1* | 12/2013 | Gerard | B64D 41/007 244/130 |
| 2015/0298643 A1 | 10/2015 | Schneider et al. | |

FOREIGN PATENT DOCUMENTS

| | | | |
|---|---|---|---|
| CN | 202642053 | 1/2013 | |
| CN | 203211502 | 9/2013 | |
| EP | 2664546 | 11/2013 | |
| GB | 1134752 | 11/1968 | |
| GB | 1134752 A | * 11/1968 | ............... B64C 1/34 |
| GB | 1172606 | 12/1969 | |
| GB | 2 344 325 | 6/2000 | |

OTHER PUBLICATIONS

European Search Report for European Application No. 19192823, two pages, dated Nov. 8, 2019.

* cited by examiner

*Primary Examiner* — Richard G Davis
(74) *Attorney, Agent, or Firm* — Nixon & Vanderhye P.C.

(57) ABSTRACT

An aircraft landing gear arrangement with an airbag attached inside a landing gear bay is disclosed. The airbag has a deflated configuration and a first inflated configuration, wherein, when the landing gear is in the extended position and when the airbag is in the first inflated configuration, the airbag closes off the landing gear bay. The airbag may substantially close off the landing gear bay. The airbag may comprise an external surface, wherein the external surface of the airbag closes off at least a significant proportion of the landing gear bay and lies substantially flush with an external surface of the aircraft body. An aircraft, methods of operating a landing gear arrangement, and methods of operating an aircraft are disclosed.

22 Claims, 3 Drawing Sheets

AIRCRAFT LANDING GEAR ARRANGEMENT

CROSS RELATED APPLICATION

This application claims priority to United Kingdom (GB) Patent Application 1813694.5, filed Aug. 22, 2018, the entire contents of which are hereby incorporated by reference.

BACKGROUND OF THE INVENTION

The present disclosure relates to an aircraft landing gear arrangement.

The present invention concerns aircraft landing gear arrangements. More particularly, but not exclusively, this invention concerns an aircraft landing gear arrangement comprising a landing gear bay, a landing gear comprising a landing gear leg and a landing gear wheel mounted on the landing gear leg, the landing gear being moveable between a retracted position where the landing gear leg and landing gear wheel are both retracted within the landing gear bay, and an extended position where the landing gear leg and landing gear wheel are both extended out of the landing gear bay such that the landing gear is arranged for landing, and an airbag attached inside the landing gear bay, the airbag having a deflated configuration and a first inflated configuration.

The invention also concerns an aircraft, methods of operating a landing gear arrangement, and methods of operating an aircraft.

Conventional landing gear arrangements are provided with rigid doors to close off the landing gear bay once the landing gear has been retracted inside the bay. The doors provide a smooth aerodynamic surface and so reduce the drag and noise of the aircraft. When the landing gear is to be extended, the doors open. The landing gear uplock is then released and the landing gear extends. The doors in some aircraft also act as a secondary way of holding the landing gear in the retracted position, in case of failure of the landing gear uplock.

Some aircraft (for example, the Boeing 737) are not provided with these conventional doors. Instead, the aperture of each landing gear bay is a shaped to correspond to the landing gear wheel being housed in the bay. Seals are then used to minimise the gaps around the wheel, in between the wheel and the edge of the landing gear bay, when the landing gear is retracted. In addition, the outer face (when retracted) of the wheel is provided with a fairing surface to provide a smooth external aerodynamic surface. The seals are inflatable and can be inflated by bleed air when the landing gear is in the retracted or extended positions, and deflated to allow the landing gear to move (extend/retract).

It is noted also that the seals will naturally inflate when the landing gear arrangement is taken to a higher altitude, due to the lower ambient pressure. Similarly, the seals will naturally deflate when the landing gear is brought to a lower altitude, because of the higher ambient pressure.

This "door-less" arrangement has the advantage that the arrangement is lighter as heavy doors are not used. This also simplifies the landing gear arrangement, as hydraulic actuators (for the doors) are not required. The arrangement is also likely to be cheaper to manufacture. It also has an added advantage that the brakes of the landing gear wheel are able to cool faster than when closed off by rigid doors.

However, this arrangement has the disadvantage that when the landing gear is extended, there is a large void (at least the size of a wheel). This void causes noise and drag issues. In particular, it causes noise issues when the aircraft is landing or taking off which can be disruptive to residents near airports and may conflict with nose regulations. In addition, the arrangement has the disadvantage that the aperture of the landing gear bay has to be precisely shaped around the wheel. Therefore, such an arrangement cannot be used for bogie landing gear arrangements, where the landing gear wheels are mounted either end of an axle, the axle being transverse to the landing gear leg.

There are also examples of airbags being designed to be used in landing gear bays in emergencies to deploy the landing gear when it has not deployed normally. One example can be seen in GB 2344325. Here, an emergency airbag is inflated by gas from a nitrogen bottle. However, of course, the airbag is designed to inflate specifically in the region of the landing gear leg to push the landing gear out. The airbag then extends past the landing gear bay when inflated.

This creates a non-aerodynamic surface and is very disadvantageous from a noise and drag point of view. Of course, this is not of a concern in GB 2344325 as the airbag is only used in an emergency, when the landing gear needs to be deployed in a secondary way. Hence, this arrangement could not be used for aerodynamic purposes.

Another point to note is that there is no means of deflating the airbag in GB 2344325 during normal use of the aircraft (e.g. flight, landing or take-off). Of course, this is not necessary, as the aircraft would have to be inspected after the malfunction of the primary means for deploying the landing gear had failed. The emergency airbag can be replaced at this time. Of course, this means that this arrangement could not be used in a routine manner.

The present invention seeks to mitigate the above-mentioned problems. Alternatively or additionally, the present invention seeks to provide an improved aircraft landing gear arrangement.

SUMMARY OF THE INVENTION

The present invention provides, according to a first aspect, an aircraft landing gear arrangement comprising a landing gear bay, a landing gear comprising a landing gear leg and a landing gear wheel mounted on the landing gear leg, the landing gear being moveable between a retracted position where the landing gear leg and landing gear wheel are both retracted within the landing gear bay, and an extended position where the landing gear leg and landing gear wheel are both extended out of the landing gear bay such that the landing gear is arranged for landing, an airbag attached inside the landing gear bay, the airbag having a deflated configuration and a first inflated configuration, wherein, when the landing gear is in the extended position and when the airbag is in the first inflated configuration, the airbag substantially closes off the landing gear bay.

Having the airbag substantially close off the landing gear bay, when the landing gear is extended, has the advantage of the landing gear arrangement, and therefore the aircraft with the landing gear arrangement, having a more aerodynamic profile when the landing gear is extended. This means the drag and noise are lower. This means the fuel efficiency, especially important on take-off, is improved and also the noise levels, especially important when landing, are lowered.

In other words, the airbag provides an effective and/or substantial fairing surface, when the landing gear is extended. This is in a similar way to the conventional rigid doors, being closed with the landing gear is extended, but without the disadvantages of having heavy doors or hydraulic actuators, or being expensive to manufacture. It also has an added advantage that the brakes of the landing gear wheel are able to cool faster than when closed off by rigid doors.

The proportion of the landing gear bay being closed off is the proportion of the external aperture area of the landing gear bay being closed off. In other words, the area of concern is the proportion of area that is covered, out of the area formed from extending an adjacent external aircraft body surface over the landing gear bay. The airbag may close off at least 50%, 70%, 90% or most preferably 95% of the landing gear bay. Importantly, whenever the term "airbag" is used, it refers to an inflatable bag that can be inflated with air or any other fluid, including liquid or gas, such as nitrogen.

The invention, according to the first aspect, is different to the "door-less" arrangement where the landing gear bay is an open void when the landing gear is extended (with only the small seals acting to cover a small outside circumference of the void). The present invention, according to the first aspect, also has the advantage that the landing gear bay does not have to be designed to correspond so closely to the wheel size. Hence, the present invention, according to the first aspect, may be used for a bogie landing gear. The invention, according to the first aspect, is also different to the GB 2344325 arrangement where the emergency airbag is not concerned with, or disclosed as, substantially closing off the landing gear bay.

The landing gear bay may be provided within an aircraft body, such as a fuselage or wing. The landing gear may be a nose or main landing gear. For example, for a nose landing gear, the landing gear bay may be provided in a nose portion of a fuselage. For example, for a main landing gear, the landing gear bay may be provided in a wing or a belly portion of a fuselage.

Preferably, the airbag comprises an external surface that acts to substantially close of the landing gear bay when the landing gear is in the extended position and when the airbag is in the first inflated configuration. Hence, the external surface of the airbag acts as an aerodynamic fairing, in a similar way to the external surface of the conventional rigid landing gear doors.

More preferably, the landing gear bay is provided within an aircraft body and wherein, when the airbag is in the first inflated configuration, the external surface of the airbag lies substantially flush with an external surface of the aircraft body. This effectively provides a single aerodynamic surface (including both the aircraft body external surface and the airbag external surface), hence, making the arrangement more aerodynamic and helping to minimising noise and drag. The airbag may comprise a substantially flat external surface. The airbag may be substantially cuboid so that a substantially flat surface of the cuboid airbag provides the substantially flush external surface. Alternatively, the airbag may comprise a curved external surface.

Preferably, the airbag comprises a plurality of plates that move in relation to each other between a collapsed configuration when the airbag is in the deflated configuration and an assembled configuration, providing an assembled plate surface, when the airbag is in the first inflated configuration. The plates may be rigid or semi-rigid. The plates do not hamper the deflation or mean the airbag requires too much space in the landing gear bay, as the plates collapse in relation to each other when the airbag is deflated. However, in the inflated configuration of the airbag, the plates provide a plate surface that may be rigid or semi-rigid and therefore, better able to provide an aerodynamic surface that is not deformed or affected by airflow or altitude.

More preferably, the airbag comprises a flexible material defining a boundary of an interior which is inflated in the first airbag inflated configuration and deflated in the airbag deflated configuration. Even more preferably, the plurality of plates are mounted on an external face of the flexible material. Alternatively, the plurality of plates are mounted on an internal face of the flexible material. The plurality of plates may be mounted on the very exterior or the airbag. The plates may be mounted so as to lie against the external or internal face of the flexible material.

Preferably, the airbag comprises a plurality of bladders, each bladder comprising a flexible material defining a boundary of an interior of the bladder which is inflated in a bladder inflated configuration and deflated in a bladder deflated configuration, wherein each bladder interior is partitioned from other bladder interiors such that at least some of the plurality of bladders can be inflated and deflated at least partially independently from other bladders. Having a plurality of bladders allows the airbag to be inflated and/or deflated in stages. Hence, in a first inflation stage (or first airbag inflated configuration), all of the bladders may be inflated. In a second inflation stage (or second airbag inflated configuration), only one or some of the bladders may be inflated. In a first deflation stage (or first deflated configuration), only one or some of the bladders may be deflated. In a second deflation stage (or second deflated configuration), all of the bladders may be deflated. The different stages may cover the landing gear bay by different amounts, allowing for movement of the landing gear and/or effective coverage of the landing gear bay.

More preferably, the plurality of bladders comprises a first bladder and a second bladder, each having an inflated and a deflated configuration, wherein i) when in the airbag deflated configuration, both first and second bladders are in their deflated configurations, ii) when in the first airbag inflated configuration, both first and second bladders are in their inflated configurations, and iii) when in a second airbag inflated configuration, the second bladder is in its deflated configuration and the first bladder is in its inflated configuration. The first bladder may only be able to be deflated when the second bladder is deflated.

Even more preferably, the first bladder is attached to the inside of the landing gear bay and wherein the second bladder is attached to the inside of the landing gear bay by its attachment to the first bladder.

When the landing gear is retracted, the airbag (for example, in a second airbag inflated configuration) may act to prevent deployment of the landing gear. In other words, the airbag prevents movement of the landing gear to the extended position. Hence, the airbag acts as a secondary mechanism to prevent accidental deployment if a primary landing gear uplock mechanism should fail.

Preferably, the airbag is attached on a side wall of the landing gear bay. In particular, the airbag may not be attached to the roof of the landing gear bay. This allows the airbag to cover the landing gear bay (by moving in from the side wall) without taking up too much room in the landing gear bay (i.e. not coming down from the roof to take up the depth of the landing gear bay).

Preferably, the airbag comprises a plurality of structural components that help define the shape of the airbag when in the first inflated configuration. The structural components may aid the airbag in providing an aerodynamic surface that is not deformed or affected by airflow or altitude.

More preferably, the plurality of structural components comprises at least one tensioner mounted between two internal locations within the airbag, to limit the distance between those two internal locations.

Even more preferably, the tensioner comprises a strap, a web, a cable or a tension spring that is under tension when the airbag is in the first inflated configuration.

Preferably, the plurality of structural components comprises at least one expandable support, such as a bellow arrangement.

The landing gear arrangement may comprise an inflation mechanism to enable the airbag to be inflated. The inflation mechanism is preferably capable of inflating the airbag after extension and/or retraction of the landing gear.

Preferably, the airbag is provided with a deflation mechanism to enable the airbag to be deflated. The deflation mechanism is preferably capable of deflating the airbag after extension and/or retraction of the landing gear.

Preferably, the deflation mechanism is capable of deflating the airbag during flight to enable the landing gear to be moved (extended and retracted). The deflation mechanism may comprise a secondary (emergency) deflation mechanism, independent of a first (primary) deflation mechanism, to enable the airbag to be deflated (and for the landing gear to move between the extended and retracted positions) when the first (primary) deflation mechanism fails.

The path of the landing gear between its extended and retracted position may pass through the location of the airbag when in the first and/or second inflated configuration.

According to a second aspect of the invention there is also provided an aircraft landing gear arrangement comprising a landing gear bay provided within an aircraft body, a landing gear comprising a landing gear leg and a landing gear wheel mounted on the landing gear leg, the landing gear being moveable between a retracted position where the landing gear leg and landing gear wheel are both retracted within the landing gear bay, and an extended position where the landing gear leg and landing gear wheel are both extended out of the landing gear bay such that the landing gear is arranged for landing, an airbag attached inside the landing gear bay, the airbag having a deflated configuration and a first inflated configuration, the airbag comprising an external surface, wherein, when the landing gear is in the extended position and when the airbag is in the first inflated configuration, the external surface of the airbag closes off at least a significant proportion of the landing gear bay and lies substantially flush with an external surface of the aircraft body.

Having the airbag close off a significant proportion of the landing gear bay, when the landing gear is extended, has the advantage of the landing gear arrangement, and therefore the aircraft with the landing gear arrangement, having a more aerodynamic profile when the landing gear is extended. This means the drag and noise are lower. This means the fuel efficiency, especially important on take-off, is improved and also the noise levels, especially important when landing, are lowered.

In other words, the airbag provides an effective and/or significant fairing surface, when the landing gear is extended. This is in a similar way to the conventional rigid doors, being closed with the landing gear is extended, but without the disadvantages of having heavy doors or hydraulic actuators, or being expensive to manufacture. It also has an added advantage that the brakes of the landing gear wheel are able to cool faster than when closed off by rigid doors.

The "significant proportion" may be a "major proportion" (at least 50%). The proportion of the landing gear bay being closed off is the proportion of the external aperture area of the landing gear bay being closed off. In other words, the area of concern is the proportion of area that is covered, out of the area formed from extending an adjacent external aircraft body surface over the landing gear bay. The airbag may close off at least 30%, 50%, 70%, 90% or most preferably 95% of the landing gear bay.

The invention, according to the second aspect, is different to the "door-less" arrangement where the landing gear bay is an open void when the landing gear is extended (with only the small seals acting to cover a small outside circumference of the void). The present invention, according to the second aspect, also has the advantage the landing gear bay does not have to be designed to correspond so closely to the wheel size. Hence, the present invention, according to the second aspect, may be used for a bogie landing gear. The invention, according to the second aspect, is also different to the GB 2344325 arrangement where the emergency airbag is not concerned with, or disclosed as, significantly closing off the landing gear bay. In addition, the present invention, according to the second aspect, provides an external surface of the airbag that acts as an aerodynamic fairing, in a similar way to the external surface of the convention, rigid landing gear doors. This effectively provides a single aerodynamic surface (including both the aircraft body external surface and the airbag external surface), hence, making the arrangement more aerodynamic and helping to minimising noise and drag.

The aircraft body may be a fuselage or wing. The landing gear may be a nose or main landing gear. For example, for a nose landing gear, the landing gear bay may be provided in a nose portion of a fuselage. For example, for a main landing gear, the landing gear bay may be provided in a wing or a belly portion of a fuselage.

According to a third aspect of the invention there is also provided an aircraft comprising an aircraft landing gear arrangement, as described above.

According to a fourth aspect of the invention there is also provided a method of operating a landing gear arrangement, the landing gear arrangement comprising a landing gear bay, a landing gear comprising a landing gear leg and a landing gear wheel mounted on the landing gear leg, the landing gear being moveable between a retracted position where the landing gear leg and landing gear wheel are both retracted within the landing gear bay, and an extended position where the landing gear leg and landing gear wheel are both extended out of the landing gear bay such that the landing gear is arranged for landing, an airbag attached inside the landing gear bay, the airbag having a deflated configuration and a first inflated configuration, the method comprising the steps of moving the landing gear from its retracted position to its extended position and then inflating the airbag to its first inflated configuration, wherein, when the airbag is in the first inflated configuration, the airbag substantially closes off the landing gear bay. Preferably, the airbag is inflated to its first inflated configuration whilst the landing gear is in its extended position.

Preferably, the method further comprises the steps of moving the landing gear from its extended position to its retracted position and then inflating the airbag to a second inflated configuration, wherein, when the airbag is in the second inflated configuration, the airbag substantially seals a gap between the landing gear bay and the landing gear wheel.

Preferably, the method further comprises the steps of deflating the airbag to its deflated configuration, and then moving the landing gear between its extended position and its retracted position. More preferably, the landing gear is moved to its retracted position whilst the airbag is in its deflated configuration.

According to a fifth aspect of the invention there is also provided a method of operating a landing gear arrangement, the landing gear arrangement comprising a landing gear bay provided within an aircraft body, a landing gear comprising a landing gear leg and a landing gear wheel mounted on the landing gear leg, the landing gear being moveable between a retracted position where the landing gear leg and landing gear wheel are both retracted within the landing gear bay, and an extended position where the landing gear leg and landing gear wheel are both extended out of the landing gear bay such that the landing gear is arranged for landing, an airbag attached inside the landing gear bay, the airbag having a deflated configuration and a first inflated configuration, the airbag comprising an external surface, the method comprising the steps of moving the landing gear from its retracted position to its extended position, and then inflating the airbag to its first inflated configuration, such that the external surface of the airbag closes off at least a significant proportion of the landing gear bay and lies substantially flush with an external surface of the aircraft body.

According to a sixth aspect of the invention there is also provided a method of operating an aircraft, including the steps of providing an aircraft, and operating the landing gear arrangement as described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
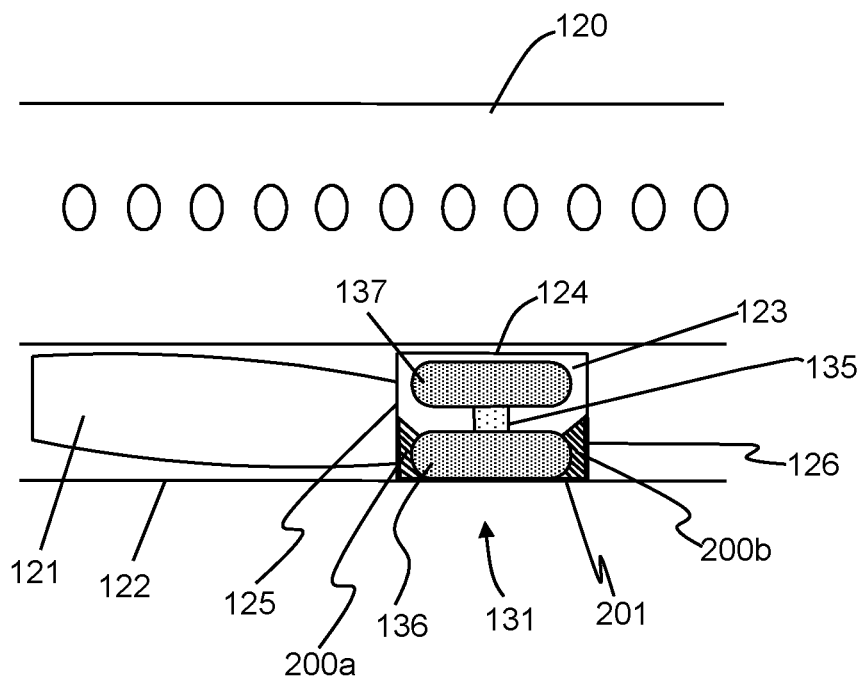
FIG. 1 shows a side cross-sectional view of a central section of an aircraft including a landing gear arrangement according to a first embodiment of the invention, the landing gear being in a retracted, or stowed, configuration.

FIG. 1 shows a side cross-sectional view of a central section of an aircraft 100 including a landing gear arrangement according to a first embodiment of the invention, the landing gear being in a retracted, or stowed, configuration.

The aircraft 100 comprises a fuselage 120. The fuselage contains the central wing box 121 and has an external lower surface 122.

Provided in the fuselage is a landing gear bay 123. The bay 123 is defined by a roof 124 and side walls 125, 126. An open face of the landing gear bay 123 faces downwards, and through this face, a landing gear 131 (a right main landing gear) can deploy. As shown in FIG. 1, the landing gear 131 is stowed within the bay 123. The open face of the bay 123 has an area of approximately 10 square metres.

The landing gear 131 has been pivoted inwards (during stowing) so as to be on its side. Hence, as shown, there is an upper wheel 137 (that becomes an inner wheel when deployed) and a lower wheel 136 (that becomes an outer wheel when deployed). The wheels 136, 137 are mounted on an axle 135. The axle 135 is mounted to a landing gear leg. The lower wheel 136 lies approximately flush with the external surface 122 of the fuselage 120.

As can be seen in this FIG., there are two airbags 200a, 200b; each extending from the respective side wall 125, 126. The airbags 200a, 200b have been inflated sufficiently to abut against and shape around the lower wheel 136. This is a second inflated configuration.

Figure 2:
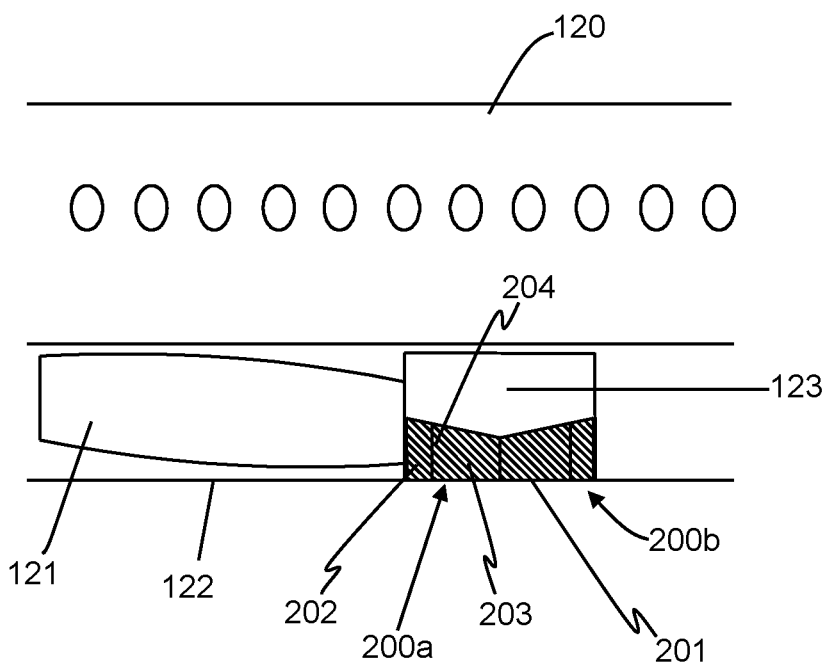
FIG. 2 shows the view as FIG. 1, the landing gear being in an extended, or deployed, configuration.

FIG. 2 shows the same view of FIG. 1, the landing gear 131 being in an extended, or deployed, configuration. The landing gear cannot be seen in this FIG., as it is not in the cross-section. Instead, it can be seen that the two airbags 200a, 200b have been inflated so as to meet in the middle of the landing gear bay 123 and thus close off the landing gear bay 123. This is a first inflated configuration. As can be seen, an external surface of the airbags 201 is flush with the external surface 122 of the fuselage 120.

Each airbag 200a, 200b is formed of two bladders 202, 203 with a partition 204 in between the bladders 202, 203. A first bladder 202 is attached to the respective side wall 125, 126 and the second bladder extends further out into the bay 123 and is attached to the first bladder 202. The second bladder 203 is only connected to the side wall 125, 126 through its connection/attachment to the first bladder 202. The bladders 202, 203 can be separately inflated and deflated.

In FIG. 2, both the first 202 and second 203 bladders are inflated. This is in comparison to FIG. 1, where only the first bladders 202 are inflated.

Figure 3:
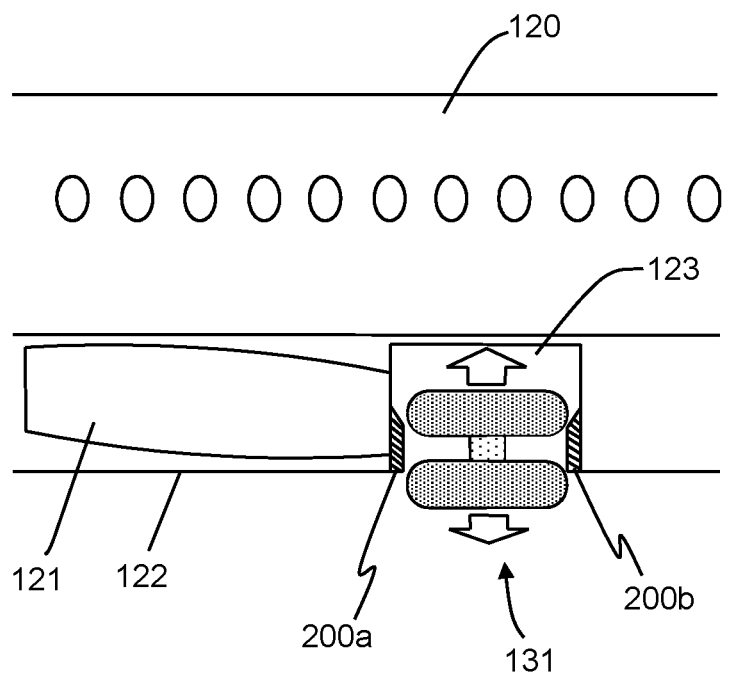
FIG. 3 shows the view as FIGS. 1 and 2, the landing gear moving between its extended, or deployed, configuration and its retracted, or stowed, configuration.

FIG. 3 shows the same view of FIGS. 1 and 2, the landing gear moving between its extended, or deployed, configuration and its retracted, or stowed, configuration. Here, both bladders 202, 203 are deflated to allow the landing gear 131 to pass into or out of the landing gear bay 123.

Figure 4:
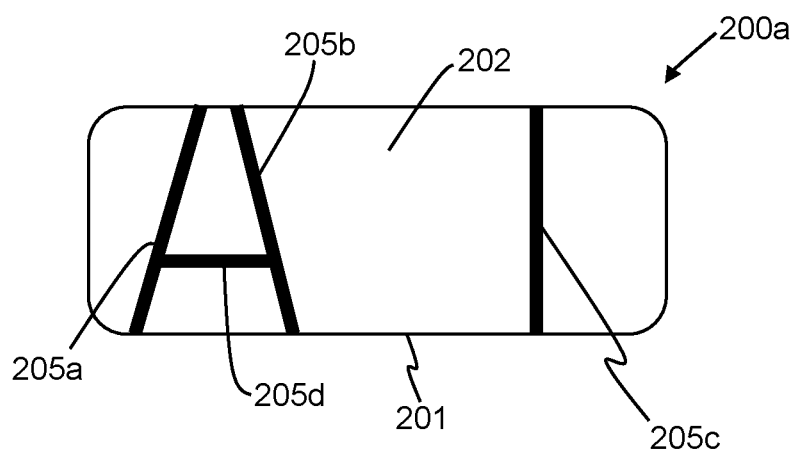
FIG. 4 shows a side schematic view of an example airbag that may be part of the landing gear arrangement, the airbag being shown provided with internal tension straps.

FIG. 4 shows a side schematic view of an example airbag 200a that may be part of the landing gear arrangement, the airbag being shown provided with internal tension straps 205a, 205b, 205c, 205d. These straps help define the shape of the airbag 200a when inflated, as they aid the airbag in providing an aerodynamic surface that is not deformed or affected by airflow or altitude. As can be seen, straps 205a, 205b and 205c each extend across bladder 202, between two internal locations at the edge of the airbag 200a. Strap 205d extends between two location; one on strap 205a and one on strap 205b.

Figure 5:
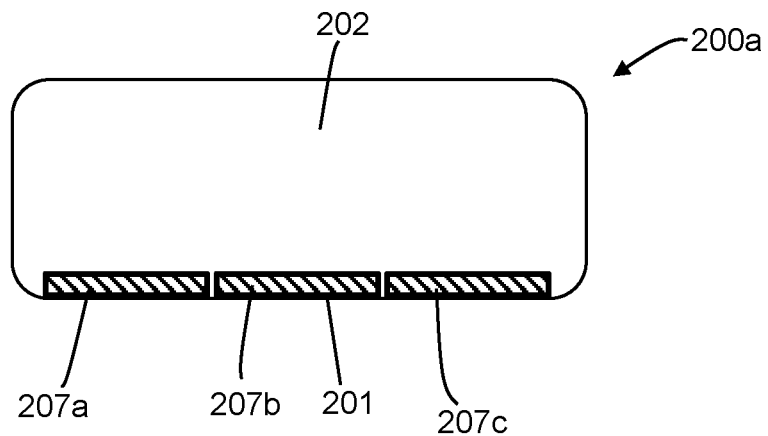
FIG. 5 shows a side schematic view of an example airbag that may be part of the landing gear arrangement, the airbag being shown provided with external plates.

FIG. 5 shows a side schematic view of an example airbag 200a that may be part of the landing gear arrangement, the airbag 200a being shown provided with internal rigid plates 207a, 207b, 207c. The plates are shown mounted on the internal face of bladder 202. Here, the airbag 200a is inflated and the plates 207 are assembled together to provide an assembled rigid surface 201. The assembled rigid surface 201 helps define the shape of the airbag 200a when inflated, as they aid the airbag in providing a rigid aerodynamic surface that is not deformed or affected by airflow or altitude. When the airbag is deflated, the plates 207 can collapse in relation to each other.

Figure 6:
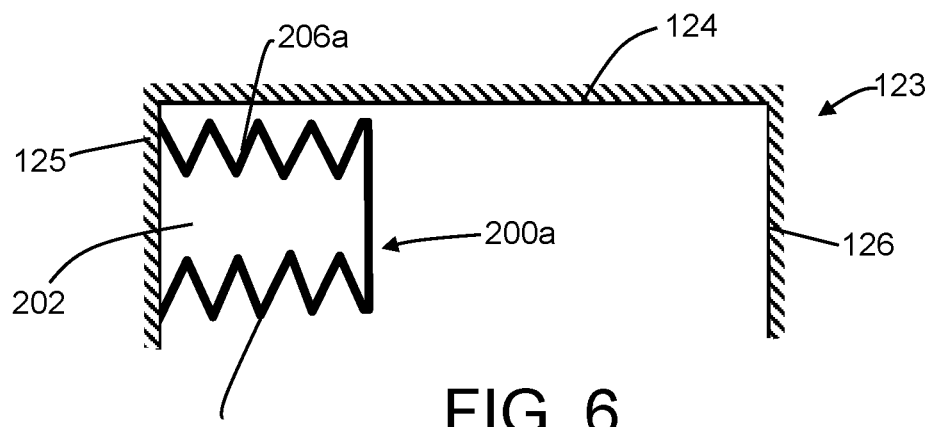
FIG. 6 shows a side schematic view of an example airbag that may be part of the landing gear arrangement, the airbag being shown provided with a bellows mechanism.

FIG. 6 shows a side schematic view of an example airbag 200a that may be part of the landing gear arrangement, the airbag being shown provided with a bellows mechanism 206. The bellows mechanism supports the airbag 200a at the top 206a and bottom 206b of the bladder 202 of the airbag 200a. Hence, as the airbag 200a and bladder 202 is inflated, the bellows support the airbag 200a to hold a rigid shape as it inflates and extends outwards away from the side wall 125 towards the middle of the landing gear bay 123. Hence, the bellows help define the shape of the airbag 200a when inflated and aid the airbag in providing an aerodynamic surface that is not deformed or affected by airflow or altitude.

The airbag 200a may be provided with any number of the plates 207, bellows 206 and tension straps 205.

Figure 7:
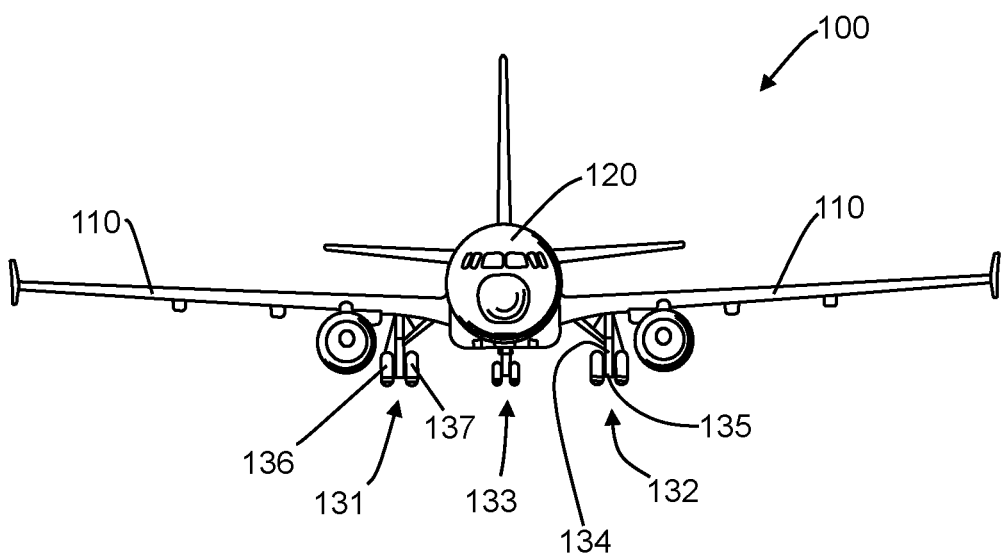
FIG. 7 shows a front view of the aircraft of FIGS. 1 to 3, the landing gear being in the extended, or deployed, configuration.

FIG. 7 shows a front view of the aircraft 100 of FIGS. 1 to 3, the landing gear being in the extended, or deployed, configuration. Here, the fuselage 120 and wings 110 of the aircraft can be seen easily. Also, the nose landing gear 133 as well as the two main landing gears 131, 132 can be seen. Each landing gear 131, 132, 133 is in the extended position, for landing.

Each landing gear 131, 132, 133 comprises a landing gear leg 134, axle 135 and two wheels 136, 137; one either side of the axle 135 and leg 134.

Each airbag 200a, 200b (or bladder 202, 203) is provided with an inflation mechanism and a deflation mechanism (neither shown). The deflation and inflation mechanism comprise a valve arrangement to allow air in and/or out of the bladder. The bladders or airbags may inflate naturally when an inflation valve is open (if the landing gear is on an aircraft at high altitude, for example). The bladders or airbags may deflate naturally when a deflation valve is open (if the landing gear is on an aircraft at low altitude, for example). The opening and closing of the valves is arranged to be executed as part of the normal sequenced process for landing gear extension and retraction.

In use, when the aircraft 100 is on the ground, the three landing gears 131, 132, 133 are already extended and all the airbags 200a, 200b are already inflated to their (full) first inflated configuration to cover off the landing gear bay 123. Both bladders 202, 203 of the airbags are inflated, as in FIG. 2.

After the aircraft 100 has taken off, the airbags 200a, 200b (both bladders 202, 203) are deflated, as in FIG. 3, and then the landing gear 131, 132, 133 is retracted into the landing gear bag 123.

Once the landing gear 131, 132, 133 have been retracted, the airbags 200a, 200b are inflated to their (partial) second inflated configuration to seal between the wheel 136 and the bay 123. Only bladder 202 of the airbags is inflated, as in FIG. 1. Here, the bladders 202 also acts as a safety measure to prevent accidental deployment of the landing gear 131, 132, 133.

When the landing gear 131, 132, 133 is to be deployed, the airbags 200a, 200b (bladders 202) are deflated, as in FIG. 3, and then the landing gear 131, 132, 133 is extended out of the landing gear bag 123, ready for landing.

Once the landing gear 131, 132, 133 have been extended, the airbags 200a, 200b are inflated to their (full) first inflated configuration to cover off the landing gear bay 123. Both bladders 202, 203 of the airbags are inflated, as in FIG. 2.

After landing, the cycle is repeated again.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The airbags 200a, 200b may be any suitable shape. For example, they may provide a substantially flat or a curved external surface. For example, the airbags 200a, 200b may be cuboid.

The airbags 200a, 200b or any one of the bladders 202, 203 of the airbags 200a, 200b may be provided with any number of the tension straps 205, bellows 206 and/or plates 207. The airbags 200a, 200b or any one of the bladders 202, 203 of the airbags 200a, 200b may be provided with only one or some of the tension straps 205, bellows 206 and/or plates 207. The airbags 200a, 200b or any one of the bladders 202, 203 of the airbags 200a, 200b may be provided with none of the straps 205, bellows 206 and/or plates 207.

The airbags 200a, 200b or any one of the bladders 202, 203 of the airbags 200a, 200b may additionally or alternatively be provided with one or more tension webs, tension cables or tension springs. The tension webs may be rigid. A tension spring may be under tension when the airbag is in the first inflated configuration.

Instead of the bellows 206, the airbags 200a, 200b or any one of the bladders 202, 203 of the airbags 200a, 200b may alternatively be provided with any other kind of expandable support.

The plates may be semi-rigid. The plates may be mounted on an external face of the bladder 202.

The inflation and deflation mechanisms may comprise an independent emergency valve to provide a secondary mechanism for deflating the airbags 200a, 200b.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft landing gear arrangement comprising:
   a landing gear bay,
   a landing gear comprising a landing gear leg and a landing gear wheel mounted on the landing gear leg, the landing gear being moveable between:
   a retracted position where the landing gear leg and landing gear wheel are both retracted within the landing gear bay, and
   an extended position where the landing gear leg and landing gear wheel are both extended out of the landing gear bay such that the landing gear is arranged for landing, an airbag attached inside the landing gear bay, the airbag having a deflated configuration and a first inflated configuration, wherein, when the landing gear is in the extended position and when the airbag is in the first inflated configuration, the airbag substantially closes off the landing gear bay wherein the airbag comprises an external surface that acts to substantially close of the landing gear bay when the landing gear is in the extended position and when the airbag is in the first inflated configuration, and wherein the airbag comprises a plurality of plates that move in relation to each other between a collapsed configuration when the airbag is in the deflated configuration and an assembled configuration, providing an assembled plate surface, when the airbag is in the first inflated configuration.

2. An aircraft landing gear arrangement as claimed in claim 1, wherein the landing gear bay is provided within an aircraft body and wherein, when the airbag is in the first inflated configuration, the external surface of the airbag lies substantially flush with an external surface of the aircraft body.

3. An aircraft landing gear arrangement as claimed in claim 1, wherein the airbag comprises a plurality of bladders, each bladder comprising a flexible material defining a boundary of an interior of the bladder which is inflated in a bladder inflated configuration and deflated in a bladder deflated configuration, wherein each bladder interior is partitioned from other bladder interiors such that at least some of the plurality of bladders can be inflated and deflated at least partially independently from other bladders.

4. An aircraft landing gear arrangement as claimed in claim 3, wherein the plurality of bladders comprises a first bladder and a second bladder, each having an inflated and a deflated configuration, wherein
 i) when in the airbag deflated configuration, both first and second bladders are in their deflated configurations,
 ii) when in the first airbag inflated configuration, both first and second bladders are in their inflated configurations, and
 iii) when in a second airbag inflated configuration, the second bladder is in its deflated configuration and the first bladder is in its inflated configuration.

5. An aircraft landing gear arrangement as claimed in claim 4, wherein the first bladder is attached to the inside of the landing gear bay and wherein the second bladder is attached to the inside of the landing gear bay by its attachment to the first bladder.

6. An aircraft landing gear arrangement as claimed in claim 1, wherein the airbag is attached on a side wall of the landing gear bay.

7. An aircraft landing gear arrangement as claimed in claim 1, wherein the airbag comprises a plurality of structural components that help define the shape of the airbag when in the first inflated configuration.

8. An aircraft landing gear arrangement as claimed in claim 7, wherein the plurality of structural components comprises at least one tensioner mounted between two internal locations within the airbag, to limit the distance between those two internal locations.

9. An aircraft landing gear arrangement as claimed in claim 8, wherein the at least one tensioner comprises a strap, a web, a cable or a tension spring that is under tension when the airbag is in the first inflated configuration.

10. An aircraft landing gear arrangement as claimed in claim 9, wherein the at least one tensioner comprises a tension spring that is under tension when the airbag is in the first inflated configuration.

11. An aircraft landing gear arrangement as claimed in claim 7, wherein the plurality of structural components comprises at least one expandable support.

12. An aircraft landing gear arrangement as claimed in claim 1, wherein the airbag is provided with a deflation mechanism to enable the airbag to be deflated.

13. An aircraft landing gear arrangement as claimed in claim 12, wherein the deflation mechanism is capable of deflating the airbag during flight to enable the landing gear to be extended and retracted.

14. An aircraft landing gear arrangement comprising:
 a landing gear bay,
 a landing gear comprising a landing gear leg and a landing gear wheel mounted on the landing gear leg, the landing gear being moveable between:
 a retracted position where the landing gear leg and a landing gear wheel are both retracted within the landing gear bay, and
 an extended position where the landing gear leg and landing gear wheel are both extended out of the landing gear bay such that the landing gear is arranged for landing,
 an airbag attached inside the landing gear bay, the airbag having a deflated configuration and a first inflated configuration,
 wherein, when the landing gear is in the extended position and when the airbag is in the first inflated configuration, the airbag substantially closes off the landing gear bay
 wherein the airbag comprises an external surface that acts to substantially close of the landing gear bay when the landing gear is in the extended position and when the airbag is in the first inflated configuration, and
 wherein the airbag comprises a plurality of plates that move in relation to each other between a collapsed configuration when the airbag is in the deflated configuration and an assembled configuration, providing an assembled plate surface, when the airbag is in the first inflated configuration,
 wherein the airbag comprises a flexible material defining a boundary of an interior which is inflated in the first airbag inflated configuration and deflated in the airbag deflated configuration.

15. An aircraft landing gear arrangement as claimed in claim 14, wherein the plurality of plates are mounted on an internal or external face of the flexible material.

16. An aircraft landing gear arrangement as claimed in claim 15, wherein the plates are mounted so as to lie against the face of the flexible material.

17. An aircraft comprising an aircraft landing gear arrangement, as claimed in claim 1.

18. A method of operating a landing gear arrangement, the landing gear arrangement comprising:
 a landing gear bay,
 a landing gear comprising a landing gear leg and a landing gear wheel mounted on the landing gear leg, the landing gear being moveable between:
 a retracted position where the landing gear leg and landing gear wheel are both retracted within the landing gear bay, and
 an extended position where the landing gear leg and landing gear wheel are both extended out of the landing gear bay such that the landing gear is arranged for landing, an airbag attached inside the landing gear bay, the airbag having a deflated configuration and a first inflated configuration, the method comprising the steps of:

moving the landing gear from its retracted position to its extended position; and then inflating the airbag to its first inflated configuration, wherein, when the airbag is in the first inflated configuration, the airbag substantially closes off the landing gear bay, moving the landing gear from its extended position to its retracted position; and then inflating the airbag to a second inflated configuration, wherein, when the airbag is in the second inflated configuration, the airbag substantially seals a gap between the landing gear bay and the landing gear wheel.

19. A method of operating an aircraft, including the steps of:

providing an aircraft, and operating the landing gear arrangement as claimed in claim 18.

20. A method of operating a landing gear arrangement, the landing gear arrangement comprising:

a landing gear bay, a landing gear comprising a landing gear leg and a landing gear wheel mounted on the landing gear leg, the landing gear being moveable between:

a retracted position where the landing gear leg and landing gear wheel are both retracted within the landing gear bay, and an extended position where the landing gear leg and landing gear wheel are both extended out of the landing gear bay such that the landing gear is arranged for landing, an airbag attached inside the landing gear bay, the airbag having a deflated configuration and a first inflated configuration, the method comprising the steps of:

moving the landing gear from its retracted position to its extended position; and then inflating the airbag to its first inflated configuration, wherein, when the airbag is in the first inflated configuration, the airbag substantially closes off the landing gear bay, further comprising the steps of:

deflating the airbag to its deflated configuration, and then moving the landing gear between its extended position and its retracted position.

21. An aircraft landing gear arrangement comprising:

a landing gear bay, a landing gear comprising a landing gear leg and a landing gear wheel mounted on the landing gear leg, the landing gear being moveable between:

a retracted position where the landing gear leg and landing gear wheel are both retracted within the landing gear bay, an extended position where the landing gear leg and landing gear wheel are both extended out of the landing gear bay such that the landing gear is arranged for landing, an airbag attached inside the landing gear bay, the airbag having a deflated configuration and a first inflated configuration, wherein, when the landing gear is in the extended position and when the airbag is in the first inflated configuration, the airbag substantially closes off the landing gear bay, wherein the airbag comprises a plurality of bladders, each bladder comprising a flexible material defining a boundary of an interior of the bladder which is inflated in a bladder inflated configuration and deflated in a bladder deflated configuration, wherein each bladder interior is partitioned from other bladder interiors such that at least some of the plurality of bladders can be inflated and deflated at least partially independently from other bladders, wherein the plurality of bladders comprises a first bladder and a second bladder, each having an inflated and a deflated configuration, wherein i) when in the airbag deflated configuration, both first and second bladders are in their deflated configurations, ii) when in the first airbag inflated configuration, both first and second bladders are in their inflated configurations, and iii) when in a second airbag inflated configuration, the second bladder is in its deflated configuration and the first bladder is in its inflated configuration, and wherein the first bladder is attached to the inside of the landing gear bay and wherein the second bladder is attached to the inside of the landing gear bay by its attachment to the first bladder.

22. An aircraft landing gear arrangement comprising:

a landing gear bay, a landing gear comprising a landing gear leg and a landing gear wheel mounted on the landing gear leg, the landing gear being moveable between:

a retracted position where the landing gear leg and landing gear wheel are both retracted within the landing gear bay, an extended position where the landing gear leg and landing gear wheel are both extended out of the landing gear bay such that the landing gear is arranged for landing, an airbag attached inside the landing gear bay, the airbag having a deflated configuration and a first inflated configuration, wherein, when the landing gear is in the extended position and when the airbag is in the first inflated configuration, the airbag substantially closes off the landing gear bay, wherein the airbag comprises a plurality of structural components that help define the shape of the airbag when in the first inflated configuration, wherein the plurality of structural components comprises at least one tensioner mounted between two internal locations within the airbag, to limit the distance between those two internal locations, and wherein the tensioner comprises a tension spring that is under tension when the airbag is in the first inflated configuration.

* * * * *